US010852612B2

(12) United States Patent
No et al.

(10) Patent No.: US 10,852,612 B2
(45) Date of Patent: Dec. 1, 2020

(54) LIQUID CRYSTAL DISPLAY DEVICE (71) Applicant: SAMSUNG DISPLAY CO., LTD., Yongin-si (KR)

(72) Inventors: Sangyong No, Seoul (KR); Kwihyun Kim, Yongin-si (KR); Jiho Moon, Cheonan-si (KR); Keebum Park, Cheonan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/733,564

(22) Filed: Jan. 3, 2020

(65) Prior Publication Data
US 2020/0142231 A1 May 7, 2020

Related U.S. Application Data (63) Continuation of application No. 15/237,673, filed on Aug. 16, 2016, now Pat. No. 10,527,901.

(30) Foreign Application Priority Data

Oct. 14, 2015 (KR) .......................... 10-2015-0143220

(51) Int. Cl.
*G02F 1/1368* (2006.01)
*G02F 1/1362* (2006.01)
(Continued)

(52) U.S. Cl.
CPC ........ *G02F 1/1368* (2013.01); *G02F 1/13439* (2013.01); *G02F 1/13624* (2013.01);
(Continued)

(58) Field of Classification Search
CPC ............. G02F 1/136286; G02F 1/1368; G02F 1/13624; G02F 1/13439; G02F 1/134309;
(Continued)

(56) References Cited

U.S. PATENT DOCUMENTS 8,587,570 B2 11/2013 Bayrle et al.
8,791,969 B2 7/2014 Kim et al.
(Continued)

FOREIGN PATENT DOCUMENTS

KR 10-2012-0013552 2/2012
KR 10-2014-0100126 8/2014
KR 10-2015-0043865 4/2015

*Primary Examiner* — Charles S Chang
(74) *Attorney, Agent, or Firm* — Kile Park Reed & Houtteman PLLC (57) ABSTRACT A liquid crystal display device includes a liquid crystal layer between first and second substrate. The first substrate includes a first and second sub-pixel areas. A first sub-pixel electrode is on the first substrate in the first sub-pixel area, and a first transistor is connected to a gate line, data line, and first sub-pixel electrode on the first substrate. A second sub-pixel electrode is on the first substrate in the second sub-pixel area, and a second transistor is connected to the gate line, the first transistor, and the second sub-pixel electrode. A first storage line is adjacent to one side of the first sub-pixel electrode. A second storage line is spaced from the first storage line and is adjacent to one side of the second sub-pixel electrode. A third transistor is connected to the gate line, second transistor, and second storage line.

18 Claims, 9 Drawing Sheets

(51) Int. Cl.
*G02F 1/1343* (2006.01)
*G02F 1/1335* (2006.01)
*G02F 1/1333* (2006.01)
G02F 1/133 (2006.01)
G02F 1/1337 (2006.01)

(52) U.S. Cl.
CPC .. *G02F 1/133345* (2013.01); *G02F 1/133512* (2013.01); *G02F 1/133514* (2013.01); *G02F 1/134309* (2013.01); *G02F 1/136286* (2013.01); *G02F 1/13306* (2013.01); *G02F 1/133528* (2013.01); *G02F 1/133788* (2013.01); *G02F 1/136227* (2013.01); *G02F 2001/133531* (2013.01); *G02F 2001/133742* (2013.01); *G02F 2001/134345* (2013.01); *G02F 2201/121* (2013.01); *G02F 2201/123* (2013.01); *G02F 2203/04* (2013.01)

(58) Field of Classification Search
CPC ......... G02F 1/133512; G02F 1/133514; G02F 1/133345; G02F 2001/134345; G02F 2201/123; G02F 2203/04; G02F 1/13306; G02F 2201/121; G02F 1/133528; G02F 2001/13351; G02F 1/133788; G02F 2001/133742; G02F 1/136227; H01L 27/156; H01L 27/1259; H01L 27/1214
USPC .................................................. 349/38, 139
See application file for complete search history.

(56) References Cited

U.S. PATENT DOCUMENTS

| | | |
|---|---|---|
| 2009/0096945 A1 | 4/2009 | Su et al. |
| 2011/0169018 A1 | 7/2011 | Hsiao et al. |
| 2011/0267567 A1 | 11/2011 | Ting et al. |
| 2013/0083263 A1* | 4/2013 | Kim .................. G02F 1/13624 349/38 |
| 2014/0218655 A1 | 8/2014 | Jeong et al. |
| 2015/0084911 A1 | 3/2015 | Stronks et al. |
| 2015/0103299 A1 | 4/2015 | Son et al. |
| 2016/0155393 A1 | 6/2016 | Jung et al. |

* cited by examiner

LIQUID CRYSTAL DISPLAY DEVICE

CROSS-REFERENCE TO RELATED APPLICATION

This is a continuation application based on currently pending U.S. patent application Ser. No. 15/237,673, filed on Aug. 16, 2016, the disclosure of which is incorporated herein by reference in its entirety. U.S. patent application Ser. No. 15/237,673 claims priority benefit of Korean Patent Application No. 10-2015-0143220, filed on Oct. 14, 2015 in the Korean Intellectual Property Office, and entitled, "Liquid Crystal Display Device," the disclosure of which is incorporated herein by reference in its entirety for all purposes.

BACKGROUND

1. Field

One or more embodiments described herein relate to a liquid crystal display device.

2. Description of the Related Art

A liquid crystal display (LCD) device includes a liquid crystal layer between two substrates having electrodes. In operation, liquid crystal molecules in the liquid crystal layer realign based on voltages applied to the electrodes. When this occurs, the amount of light transmitted through the liquid crystal layer is adjusted to form an image.

In an attempt to improve visibility, each pixel may include two separate sub-pixel electrodes. Data signals applied to the sub-pixel electrodes may have different voltage levels. According to one approach, a data signal may be applied to one of the sub-pixel electrodes without modulation. This data signal may then be divided and applied to the other sub-pixel electrode. This approach may produce undesirable visual artifacts (e.g., afterimage, flicker, etc.) due to voltage (IR) drop in a voltage wiring. As a result, display quality may be degraded.

SUMMARY

In accordance with one or more embodiments, a liquid crystal display device includes a first substrate including a first sub-pixel area and a second sub-pixel area; a second substrate opposing the first substrate; a liquid crystal layer between the first substrate and the second substrate; a gate line and a data line on the first substrate; a first sub-pixel electrode on the first substrate and in the first sub-pixel area; a first transistor connected to the gate line, the data line, and the first sub-pixel electrode; a second sub-pixel electrode on the first substrate and in the second sub-pixel area; a second transistor connected to the gate line, the first transistor, and the second sub-pixel electrode; a first storage line adjacent to one side of the first sub-pixel electrode; a second storage line spaced apart from the first storage line and adjacent to one side of the second sub-pixel electrode; and a third transistor connected to the gate line, the second transistor, and the second storage line.

The first storage line and the second storage line may receive storage voltages having different levels from one another. The first storage line may overlap the first sub-pixel electrode. The first storage line may overlap the second sub-pixel electrode.

The display device may include a third storage line adjacent to another side of the first sub-pixel electrode. The third storage line may be spaced apart from the first storage line and is connected to the second storage line. The third storage line and the second storage line may receive storage voltages having a substantially equal level. The third storage line may be connected to the first storage line and is spaced apart from the second storage line. The third storage line and the first storage line may receive storage voltages having a substantially equal level. The third storage line may overlap the first sub-pixel electrode overlap.

The display device may include a passivation layer on the data line, the first transistor, the second transistor, and the third transistor. A first contact hole and a second contact hole through which a first drain electrode of the first transistor and a second drain electrode of the second transistor are exposed may be defined in portions of the passivation layer above the first storage line, respectively. A third contact hole through which a third drain electrode of the third transistor is exposed may be defined in a portion of the passivation layer above the second storage line.

The first sub-pixel electrode may include a first stem electrode and a first branch electrode extending from the first stem electrode. The second sub-pixel electrode may include a second stem electrode and a second branch electrode extending from the second stem electrode. A first source electrode of the first transistor and a second source electrode of the second transistor may be connected to one another to collectively have a substantially W shape.

A first drain electrode of the first transistor and a second drain electrode of the second transistor may extend in a substantially same direction. The first drain electrode of the first transistor and the second drain electrode of the second transistor may extend toward the second sub-pixel electrode. The third transistor may include a third gate electrode, a third source electrode, a third drain electrode, and a floating electrode between the third source electrode and the third drain electrode. The floating electrode may overlap the third gate electrode.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

In the drawings, the dimensions of layers and regions may be exaggerated for clarity of illustration. It will also be understood that when an element (e.g., a layer) is referred to as being "on" another element or substrate, it can be directly on the other element or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

Figure 1:
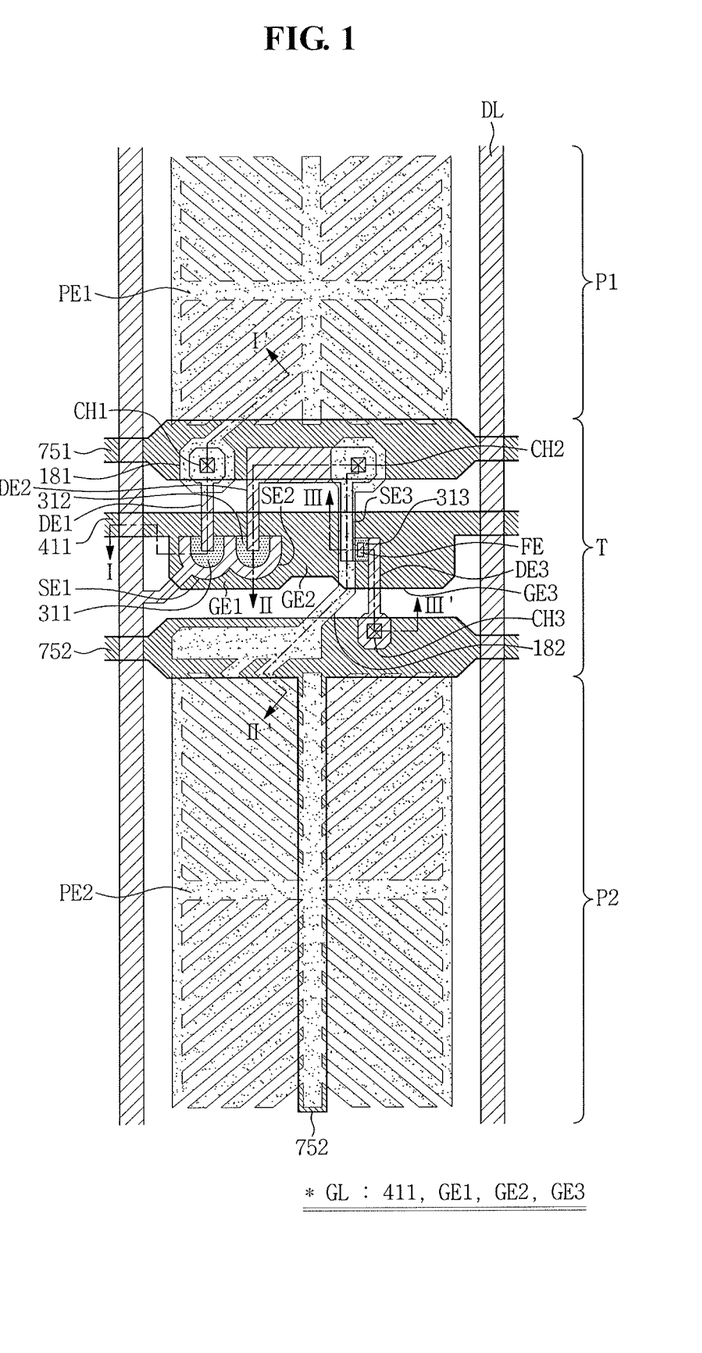
FIG. 1 illustrates an embodiment of a pixel.
Figure 2:
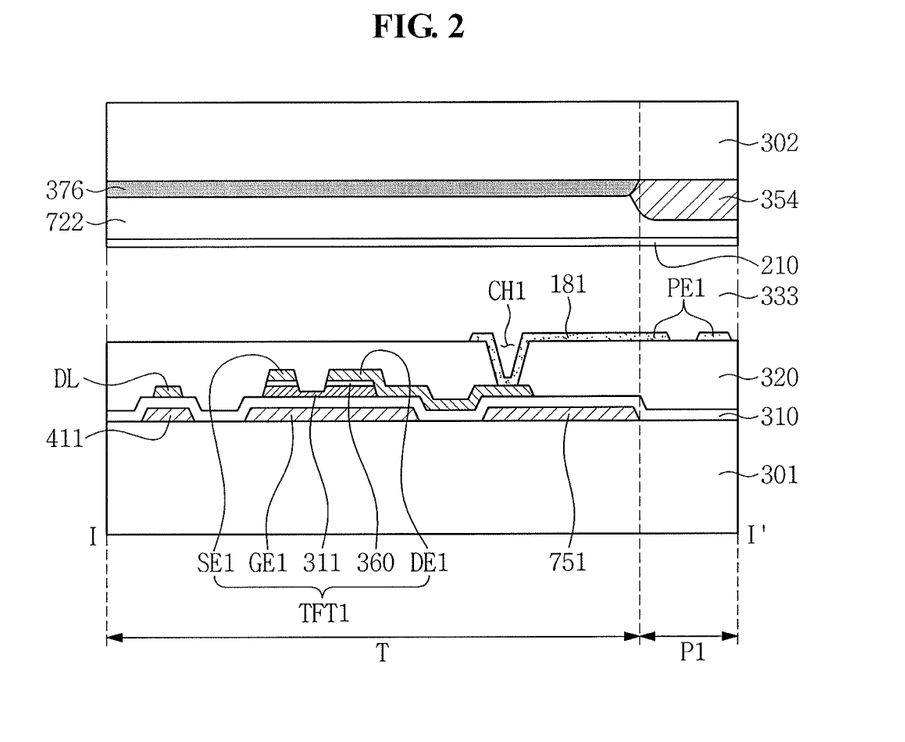
FIG. 2 illustrates a cross-sectional view taken along line I-I' in FIG. 1.
Figure 3:
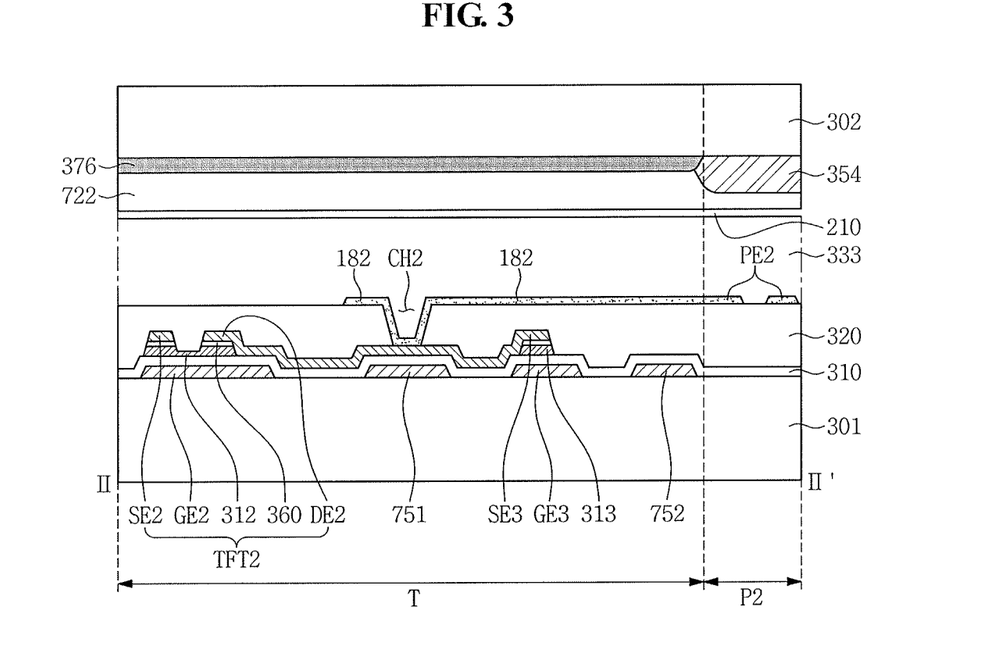
FIG. 3 illustrates a cross-sectional view taken along line II-II' in FIG. 1.
Figure 4:
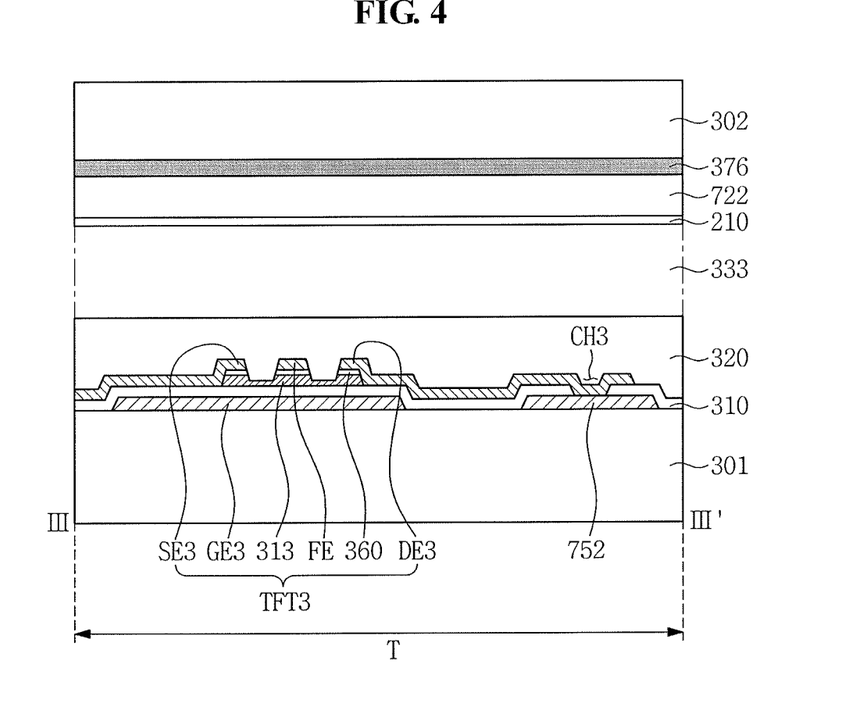
FIG. 4 illustrates a cross-sectional view taken along line III-III' in FIG. 1.

FIG. 1 illustrates an embodiment of a pixel, FIG. 2 illustrates a cross-sectional view taken along line I-I' in FIG. 1, FIG. 3 illustrates a cross-sectional view taken along line II-II' in FIG. 1, and FIG. 4 illustrates a cross-sectional view taken along line III-III' in FIG. 1.

Referring to FIGS. 1 to 4, the pixel includes a first thin film transistor TFT1, a second thin film transistor TFT2, a third thin film transistor TFT3, a first storage line 751, a second storage line 752, a color filter 354, a first sub-pixel electrode PE1, a first extension electrode 181, a second sub-pixel electrode PE2, a second extension electrode 182, a common electrode 210, and a liquid crystal layer 333.

The first thin film transistor TFT1 includes a first gate electrode GE1, a first semiconductor layer 311, a first drain electrode DE1, and a first source electrode SE1. The second thin film transistor TFT2 includes a second gate electrode GE2, a second semiconductor layer 312, a second drain electrode DE2, and a second source electrode SE2. The third thin film transistor TFT3 includes a third gate electrode GE3, a third semiconductor layer 313, a third drain electrode DE3, and a third source electrode SE3.

As illustrated in FIG. 1, a gate line GL is on a first substrate 301. For example, the gate line GL may be disposed in a transistor area T of the first substrate 301. The transistor area T is between a first sub-pixel area P1 and a second sub-pixel area P2.

Figure 5:
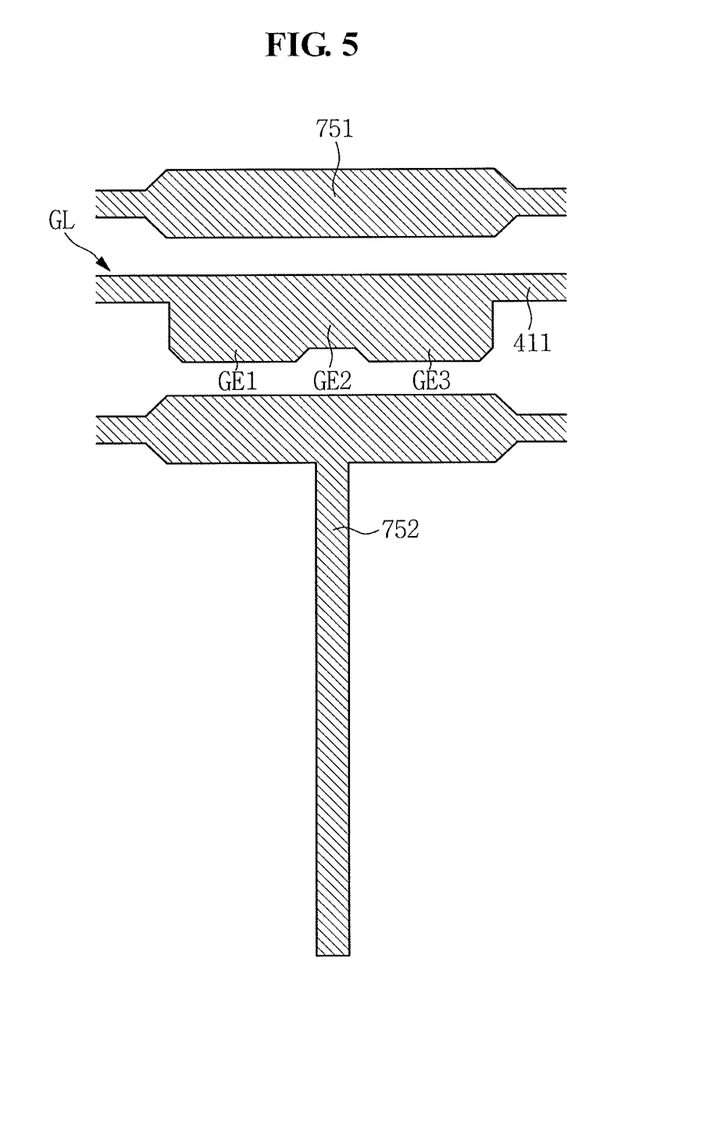
FIG. 5 illustrates an embodiment of various lines in FIG. 1.

FIG. 5 illustrates an embodiment of the first storage line 751, the gate line GL, and the second storage line 752 in FIG. 1. Referring to FIGS. 1 and 5, the gate line GL includes a linear portion 411, the first gate electrode GE1, the second gate electrode GE2, and the third gate electrode GE3 having different line widths from one another. In an exemplary embodiment, each of the first, second, and third gate electrodes GE1, GE2, and GE3 may have a wider line width than the line width of the linear portion 411. The linear portion 411 and the first, second, and third gate electrodes GE1, GE2, and GE3 may be formed as a unitary, integral structure, e.g., having a one-piece construction.

The gate line GL may have a connection portion (e.g., an end portion) having a wider width than the width of another portion thereof and may be connected to another layer or an external driving circuit. In an exemplary embodiment, the gate line GL may include at least one of an aluminum (Al)-based metal, e.g., Al or an Al alloy, a silver (Ag)-based metal, e.g., Ag or a Ag alloy, a copper (Cu)-based metal, e.g., Cu or a Cu alloy, and/or a molybdenum (Mo)-based metal, e.g., Mo or a Mo alloy. In another exemplary embodiment, the gate line GL may include one of chromium (Cr), tantalum (Ta), and titanium (Ti). In an exemplary embodiment, the gate line GL may have a multilayer structure including at least two conductive layers having different physical properties from one another.

The first storage line 751 is on the first substrate 301. For example, the first storage line 751 is in the transistor area T of the first substrate 301. The first storage line 751 is adjacent to one side of the first sub-pixel electrode PE1. In an exemplary embodiment, the first storage line 751, as illustrated in FIGS. 1 and 5, is at a lower side of the first sub-pixel electrode PE1 and may have a linear shape. In such an exemplary embodiment, the first storage line 751 and the first sub-pixel electrode PE1 may or may not overlap one another. In the case that the first storage line 751 and the first sub-pixel electrode PE1 overlap one another, a portion of the first storage line 751 and at least one side of the first sub-pixel electrode PE1 may overlap one another.

The first storage line 751 receives an externally applied first storage voltage Vcst. The first storage voltage Vcst may be, for example, a direct current ("DC") voltage. The first storage line 751 may include substantially the same material and may have substantially the same structure (e.g., multilayer structure) as those of the gate line GL. In other words, the gate line GL and the first storage line 751 may be simultaneously provided in substantially the same process. In another embodiment, the materials and structures may be different.

The second storage line 752 is on the first substrate 301. For example, the second storage line 752 is in the transistor area T of the first substrate 301. The second storage line 752 is adjacent to one side of the second sub-pixel electrode PE2. In an exemplary embodiment, the second storage line 752, as illustrated in FIGS. 1 and 5, is adjacent to at least one side of the second sub-pixel electrode PE2. In such an exemplary embodiment, the second storage line 752 and the second sub-pixel electrode PE2 may or may not overlap one another. In the case that the second storage line 752 and the second sub-pixel electrode PE2 overlap one another, a portion of the second storage line 752 may overlap at least one side of the second sub-pixel electrode PE2 and a stem electrode of the second sub-pixel electrode PE2.

Unlike the example in FIG. 1, the second storage line 752 may not overlap the stem electrode of the second sub-pixel electrode PE2 and may overlap only an edge of the second sub-pixel electrode PE2.

In an exemplary embodiment, the second storage line 752 and the first storage line 751 are not connected to one another. In such an exemplary embodiment, the second storage line 752 and the first storage line 751 are spaced apart from one another.

The second storage line 752 receives an externally applied second storage voltage Vrd. The second storage voltage Vrd and the first storage voltage Vcst may have different levels from one another. For example, the second storage voltage Vrd may be a DC voltage having a level higher or lower than the level of the first storage voltage Vcst.

When the level of the second storage voltage Vrd is lower than the level of the first storage voltage Vcst, afterimage elimination efficiency of the display device may be increased. When the level of the second storage voltage Vrd is higher than the level of the first storage voltage Vcst, flicker elimination efficiency of the display device may be increased.

In an exemplary embodiment, for example, the level of the second storage voltage Vrd may be adjusted in a state where the level of the first storage voltage Vcst is maintained at a substantially constant level. When the level of the first storage voltage Vcst is maintained at a substantially constant level, the level of the second storage voltage Vrd may vary to be lower or higher than the level of first storage voltage Vcst.

The second storage line 752 may include substantially the same material and may have substantially the same structure (e.g., multilayer structure) as those of the gate line GL. In other words, the gate line GL and the second storage line 752 may be simultaneously provided in substantially the same process. The materials or structures may be different in another embodiment.

Unlike in some types of displays, the second storage line 752 is not adjacent to the first sub-pixel electrode PE1. Accordingly, the first sub-pixel electrode PE1 may not form coupling capacitance with the second storage line 752. Thus, the data voltage applied to the first sub-pixel electrode PE1 may not be affected by a voltage (e.g., IR) drop in the second storage line 752. As a result, the voltage level variation in the data voltage of the first sub-pixel electrode PE1 due to IR drop in the second storage line 752 may be reduced. The reduced voltage level variation in the data voltage may allow image quality degradation to be mitigated.

In an exemplary embodiment, a gate insulating layer 310 is on the gate line GL, the first storage line 751, and the second storage line 752. In such an exemplary embodiment, the gate insulating layer 310 may be over substantially the entire surface of the first substrate 301 on which the first storage line 751 and the second storage line 752 are disposed. The gate insulating layer 310 may include silicon nitride ($SiN_X$), silicon oxide ($SiO_X$), or the like. The gate insulating layer 310 may have a multilayer structure including at least two insulating layers having different physical properties.

In an exemplary embodiment, the first, second, and third semiconductor layers 311, 312, and 313 are on the gate insulating layer 310. In such an exemplary embodiment, the first, second, and third semiconductor layers 311, 312, and 313 overlap the first, second, and third gate electrodes GE1, GE2, and GE3, respectively. The first, second, and third semiconductor layers 311, 312, and 313 may be connected to one another. For example, as illustrated in FIG. 1, the first semiconductor layer 311 and the second semiconductor layer 312 are connected to one another. The first, second, and third semiconductor layers 311, 312, and 313 may include, for example, amorphous silicon, polycrystalline silicon, or the like.

An ohmic contact layer 360 is on the first, second, and third semiconductor layers 311, 312, and 313. The ohmic contact layer 360 may include, for example, silicide, or n+ hydrogenated amorphous silicon doped with n-type impurities, such as phosphorus, at high concentration.

The first drain electrode DE1 and the first source electrode SE1 of the first thin film transistor TFT1, the second drain electrode DE2 and the second source electrode SE2 of the second thin film transistor TFT2, and the third drain electrode DE3 and the third source electrode SE3 of the third thin film transistor TFT3 are on the ohmic contact layer 360.

In the exemplary embodiment of FIG. 1, the first source electrode SE1 extends from the data line DL to the transistor area T and is disposed on the first gate electrode GE1 and the first semiconductor layer 311. The first source electrode SE1 overlaps the first gate electrode GE1 and the first semiconductor layer 311. In another exemplary embodiment, the first source electrode SE1 may further overlap the linear portion 411. The first source electrode SE1 may have, for example, one of a C-like shape, an inverted C-like shape, a U-like shape, or an inverted U-like shape. For illustrative purposes only, FIG. 1 illustrates the first source electrode SE1 as having a U-like shape with a curved portion opposite to the second sub-pixel electrode PE2.

In an exemplary embodiment, the first source electrode SE1 may include a refractory metal such as molybdenum (Mo), chromium (Cr), tantalum (Ta), and titanium (Ti), or an alloy thereof, for example. In an exemplary embodiment, the first source electrode SE1 may have a multilayer structure including a refractory metal layer and a low-resistance conductive layer. Examples of the multilayer structure include: a double-layer structure including a Cr or Mo (alloy) lower layer and an Al (alloy) upper layer, and a triple-layer structure including a Mo (alloy) lower layer, an Al (alloy) intermediate layer, and a Mo (alloy) upper layer. The first source electrode SE1 may include another metal or conductor material, in addition to, or instead of, the aforementioned materials.

In an exemplary embodiment, the first drain electrode DE1 is on the first gate electrode GE1 and the first semiconductor layer 311. The first drain electrode DE1 overlaps the first gate electrode GE1, the first semiconductor layer 311, and the first extension electrode 181. In such an exemplary embodiment, the first drain electrode DE1 is connected to the first extension electrode 181 through a first contact hole CH1. In another exemplary embodiment, the first drain electrode DE1 may further overlap the linear portion 411.

The first drain electrode DE1 may include substantially the same material and may have substantially the same structure (e.g., multilayer structure) as those of the first source electrode SE1. In other words, the first source electrode SE1 and the first drain electrode DE1 may be simultaneously provided in substantially the same process. The materials and structures may be different in another embodiment.

In an exemplary embodiment, the first gate electrode GE1, the first drain electrode DE1, the first source electrode SE1, the first semiconductor layer 311, and the ohmic contact layer 360 collectively define the first thin film transistor TFT1. In such an exemplary embodiment, a channel of the first thin film transistor TFT1 is defined in a portion of the first semiconductor layer 311 between the first drain electrode DE1 and the first source electrode SE1. The portion of the first semiconductor layer 311 corresponding to the channel may have a thickness less than that of another portion thereof. The first thin film transistor TFT1, in FIG. 1, is in the transistor area T.

The second source electrode SE2 is electrically connected to the first source electrode SE1. In an exemplary embodiment, the second source electrode SE2 and the first source electrode SE1 may be integrally formed as unitary structure, e.g., having a one-piece construction. For example, the first source electrode SE1 and the second source electrode SE2 may be connected to one another to collectively provide a single unitary and indivisible structure. In such an exemplary embodiment, the first source electrode SE1 and the second source electrode SE2 may collectively have an overall W-like shape with a single unitary and indivisible structure.

In an exemplary embodiment, the second source electrode SE2 is on the second gate electrode GE2 and the second semiconductor layer 312. The second source electrode SE2 overlaps the second gate electrode GE2 and the second semiconductor layer 312. In another exemplary embodiment, the second source electrode SE2 may further overlap the linear portion 411. The second source electrode SE2 may have, for example, one of a C-like shape, an inverted C-like shape, a U-like shape, or an inverted U-like shape. FIG. 1 illustrates the second source electrode SE2 as having a U-like shape having a curved portion opposite to the second sub-pixel electrode PE2.

The curved portion of the first source electrode SE1 and the curved portion of the second source electrode SE2 extend toward the second sub-pixel electrode PE2.

The second source electrode SE2 may include substantially the same material and may have substantially the same structure (e.g., multilayer structure) as those of the first source electrode SE1. In other words, the second source electrode SE2 and the first source electrode SE1 may be simultaneously provided in substantially the same process. The materials and structures may be different in another embodiment.

In an exemplary embodiment, the second drain electrode DE2 is on the second gate electrode GE2 and the second semiconductor layer 312. The second drain electrode DE2 overlaps the second gate electrode GE2, the second semiconductor layer 312, and the second extension electrode 182. In such an exemplary embodiment, the second drain electrode DE2 is connected to the second extension electrode 182 through a second contact hole CH2. In another exemplary embodiment, the second drain electrode DE2 may further overlap the linear portion 411.

The second drain electrode DE2 may include substantially the same material and may have substantially the same structure (e.g., multilayer structure) as those of the first source electrode SE1. In other words, the second drain electrode DE2 and the first source electrode SE1 may be simultaneously provided in substantially the same process. The materials and structures may be different in another embodiment.

The first drain electrode DE1 and the second drain electrode DE2 extend in substantially the same direction. For example, in FIG. 1, the first drain electrode DE1 and the second drain electrode DE2 extend toward the first source electrode SE1 and the second source electrode SE2, respectively, or toward the second sub-pixel electrode PE2.

In an exemplary embodiment, the second gate electrode GE2, the second drain electrode DE2, the second source electrode SE2, the second semiconductor layer 312, and the ohmic contact layer 360 collectively define the second thin film transistor TFT2. In such an exemplary embodiment, a channel of the second thin film transistor TFT2 is defined in a portion of the second semiconductor layer 312 between the second drain electrode DE2 and the second source electrode SE2. The portion of the second semiconductor layer 312 corresponding to the channel has a thickness less than that of another portion of the second semiconductor layer 312. The second thin film transistor TFT2, in FIG. 1, is in the transistor area T.

The third source electrode SE3 is electrically connected to the second drain electrode DE2. The third source electrode SE3 and the second drain electrode DE2 may be integrally formed to have a unitary structure, e.g., one-piece construction. In an exemplary embodiment, the third source electrode SE3 is on the third gate electrode GE3 and the third semiconductor layer 313. The third source electrode SE3 overlaps the third gate electrode GE3, the third semiconductor layer 313, and the second extension electrode 182. In another exemplary embodiment, the third source electrode SE3 may further overlap the linear portion 411.

The third source electrode SE3 may include substantially the same material and may have substantially the same structure (e.g., multilayer structure) as those of the first source electrode SE1. In other words, the third source electrode SE3 and the first source electrode SE1 may be simultaneously provided in substantially the same process. The materials and structures may be different in another embodiment.

In an exemplary embodiment, the third drain electrode DE3 is on the third gate electrode GE3, the third semiconductor layer 313, and the second storage line 752. The third drain electrode DE3 overlaps the third gate electrode GE3, the third semiconductor layer 313, and the second extension line 752. In such an exemplary embodiment, the third drain electrode DE3 is connected to the second storage line 752 through a third contact hole CH3.

The third drain electrode DE3 may include substantially the same material and may have substantially the same structure (e.g., multilayer structure) as those of the first source electrode SE1. In other words, the third drain electrode DE3 and the first source electrode SE1 may be simultaneously provided in substantially the same process. The materials and structures may be different in another embodiment.

In an exemplary embodiment, a floating electrode FE is on a portion of the third semiconductor layer 313 between the third source electrode SE3 and the third drain electrode DE3. In one embodiment, the floating electrode FE may include a plurality of floating electrodes spaced apart from one another and arranged in a row. The floating electrode FE overlaps the third gate electrode GE3. The floating electrode FE may include substantially the same material and may have substantially the same structure (e.g., multilayer structure) as those of the first source electrode SE1. In other words, the floating electrode FE and the first source electrode SE1 may be simultaneously provided in substantially the same process. The materials and structures may be different in another embodiment. Also, in another exemplary embodiment, the floating electrode FE may be omitted.

In an exemplary embodiment, the third gate electrode GE3, the third drain electrode DE3, the third source electrode SE3, the third semiconductor layer 313, the floating electrode FE, and the ohmic contact layer 360 collectively define the third thin film transistor TFT3. In such an exemplary embodiment, channels of the third thin film transistor TFT3 are respectively defined in a portion of the third semiconductor layer 313 between the third source electrode SE3 and the floating electrode FE and in a portion of the third semiconductor layer 313 between the floating electrode FE and the third drain electrode DE3. The portion of the third semiconductor layer 313 corresponding to the channel may have a thickness less than that of another portion thereof. The third thin film transistor TFT3, in FIG. 1, is in the transistor area T.

Because each of the first contact hole CH1 and the second contact hole CH2 is defined in a portion of the passivation layer 320 above the first storage line 751, voltage level variations in the data voltage applied to the first sub-pixel electrode PE1 and in a data voltage applied to the second sub-pixel electrode PE2 are reduced. For example, because an overlapping area of the second storage line 752 with each of the first sub-pixel electrode PE1 and the second sub-pixel electrode PE2 is reduced, voltage level variations in the data voltage of the first sub-pixel electrode PE1 and in the data voltage of the second sub-pixel electrode PE2, due to IR drop in the second storage line 752, are reduced. Because the voltage level variations in the data voltage of the first sub-pixel electrode PE1 and in the data voltage of the second sub-pixel electrode PE2 are reduced, image quality degradation may be mitigated. To provide such a configuration as described above, the third thin film transistor TFT3 may be connected to the second storage line 752 through the third contact hole CH3.

The data line DL is on the gate insulating layer 310. The data line DL may have a connection portion (e.g., an end portion) wider width than a width of another portion thereof and may be connected to another layer or an external driving circuit.

The data line DL intersects the gate line GL, the first storage line 751, and the second storage line 752. The data line DL may have a narrower line width at a portion that intersects the gate line GL than a line width of another portion thereof. Similarly, the data line DL may have a narrower line width at a portion that intersects the first or second storage line 751 or 752 than a line width of another portion thereof. Accordingly, parasitic capacitance between the data line DL and the gate line GL and capacitance between the data line DL and the first or second storage line 751 or 752 may be reduced. The data line DL may include substantially the same material and may have substantially the same structure (e.g., multilayer structure) as those of the first source electrode SE1. For example, the data line DL and the first source electrode SE1 may be simultaneously provided in substantially the same process. The materials and structures may be different in another embodiment.

A semiconductor layer and an ohmic contact layer may be provided below the data line DL, the first, second, and third drain electrodes DE1, DE2, and DE3, and the first, second, and third source electrodes SE1, SE2, and SE3.

In an exemplary embodiment, a passivation layer 320 may be on the data line DL, the first, second, and third drain electrodes DE1, DE2, and DE3, and the first, second, and third source electrodes SE1, SE2, and SE3. In such an exemplary embodiment, the passivation layer 320 may be over substantially the entire surface of the first substrate 301 on which the data line DL, the first, second, and third drain electrodes DE1, DE2, and DE3, and the first, second, and third source electrodes SE1, SE2, and SE3 are disposed. The passivation layer 320 may serve to remove a step difference among components between the passivation layer 320 and the first substrate 301, such as the components of the first substrate 301, e.g., the data line DL, the first, second, and third drain electrodes DE1, DE2, and DE3, and the first, second, and third source electrodes SE1, SE2, and SE3. In addition, the passivation layer 320 may serve to protect the components of the first substrate 301.

In an exemplary embodiment, the passivation layer 320 may include an inorganic insulating material such as $SiN_x$ or $SiO_x$. In the case where the passivation layer 320 includes such an inorganic insulating material, the inorganic insulating material may have photosensitivity and a dielectric constant, for example, of about 4.0.

In an exemplary embodiment, the passivation layer 320 may have a double-layer structure including a lower inorganic layer and an upper organic layer. The double-layer structure of the passivation layer 320 may enable the passivation layer 320 to have a relatively high insulating property due to the organic layer in the double-layer structure, and may substantially reduce or effectively prevent damage to exposed portions of the first, second, and third semiconductor layers 311, 312, and 313. In an exemplary embodiment, the passivation layer 320 may have a thickness of greater than or equal to about 5,000 ångstroms (Å), for example, in a range of about 6,000 Å to about 8,000 Å. This thickness may be different in another embodiment.

The first, second, and third contact holes CH1, CH2, and CH3 are defined through the passivation layer 320. The first, second, and third drain electrodes DE1, DE2, and DE3 are exposed through the first, second, and third contact holes CH1, CH2, and CH3, respectively.

In an exemplary embodiment, the first sub-pixel electrode PE1 is on the passivation layer 320. In such an exemplary embodiment, the first sub-pixel electrode PE1 is on a portion of the passivation layer 320 that is in the first sub-pixel area P1.

Figure 6:
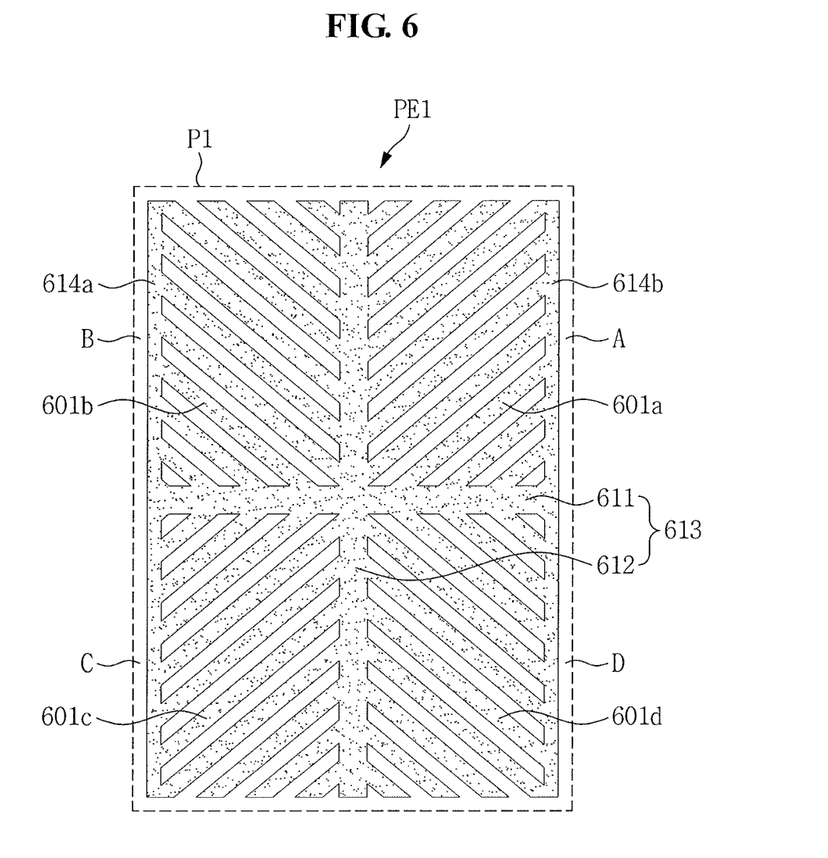
FIG. 6 illustrates an embedment of a first sub-pixel electrode.

FIG. 6 illustrates an embodiment of the first sub-pixel electrode PE1 which includes a stem electrode 613, and a plurality of branch electrodes. The stem electrode 613 and plurality of branch electrodes may be integrally formed with a unitary structure.

The stem electrode 613 divides the first sub-pixel area P1 into a plurality of domains. In an exemplary embodiment, the stem electrode 613 includes a horizontal portion 611 and a vertical portion 612 which intersect one another. The horizontal portion 611 divides the first sub-pixel area P1 into two domains. The vertical portion 612 divides each of the divided domains further into two smaller domains. Accordingly, the first sub-pixel area P1 is divided into four domains A, B, C, and D by the stem electrode 613 including the horizontal portion 611 and the vertical portion 612.

In such an exemplary embodiment, the branch electrodes include first, second, third, and fourth branch electrodes 601*a*, 601*b*, 601*c*, and 601*d* extending from the stem electrode 613 in different directions from one another. In such an exemplary embodiment, the first, second, third, and fourth branch electrodes 601*a*, 601*b*, 601*c*, and 601*d* extend from the stem electrode 613 to the domains A, B, C, and D, respectively. In an exemplary embodiment, the first branch electrode 601*a* extends to a first domain A, the second branch electrode 601*b* extends to a second domain B, the third branch electrode 601*c* extends to a third domain C, and the fourth branch electrode 601*d* extends to a fourth domain D.

The first branch electrode 601*a* and the second branch electrode 601*b* are symmetrical to one another with respect to the vertical portion 612. The third branch electrode 601*c* and the fourth branch electrode 601*d* are symmetrical to one another with respect to the vertical portion 612. The first branch electrode 601*a* and the fourth branch electrode 601*d* are symmetrical to one another with respect to the horizontal portion 611. The second branch electrode 601*b* and the third branch electrode 601*c* are symmetrical to one another with respect to the horizontal portion 611.

In an exemplary embodiment, the first branch electrode 601*a* may include a plurality of branch electrodes in the first domain A. The plurality of first branch electrodes 601*a* may be aligned in parallel to one another. In such an exemplary embodiment, at least one of the first branch electrodes 601*a* extends diagonally upward from one side of the horizontal portion 611 near a boundary line of the first domain A. The remainder of the first branch electrodes 601*a* extend diagonally upward from one side of the vertical portion 612 that is near a boundary line of the first domain A.

In an exemplary embodiment, the second branch electrode 601*b* may include a plurality of branch electrodes in the second domain B. The plurality of second branch electrodes 601*b* may be aligned in parallel to one another. In such an exemplary embodiment, at least one of the second branch electrodes 601*b* extends diagonally upward from one side of the horizontal portion 611 near a boundary line of the second domain B. The remainder of the second branch electrodes 601*b* extend diagonally upward from one side of the vertical portion 612 near a boundary line of the second domain B.

In an exemplary embodiment, the third branch electrode 601*c* may include a plurality of branch electrodes in the third domain C. The plurality of third branch electrodes 601*c* may be aligned in parallel to one another. In such an exemplary embodiment, at least one of the third branch electrodes 601*c* extends diagonally downward from one side of the horizontal portion 611 near a boundary line of the third domain C. The remainder of the third branch electrodes 601*c* extend diagonally downward from one side of the vertical portion 612 near a boundary line of the third domain C.

In an exemplary embodiment, the fourth branch electrode 601*d* may include a plurality of branch electrodes in the fourth domain D. The plurality of fourth branch electrodes 601*d* may be aligned in parallel to one another. In such an exemplary embodiment, at least one of the fourth branch electrodes 601*d* extends diagonally downward from one side of the horizontal portion 611 near a boundary line of the fourth domain D. The remainder of the fourth branch electrodes 601*d* extend diagonally downward from one side of the vertical portion 612 near a boundary line of the fourth domain D.

The stem electrode 613 may further include a first connecting portion 614*a* and a second connecting portion 614*b*. The first connecting portion 614*a* is connected to one end of the horizontal portion 611. The second connecting portion 614*b* is connected to another end of the horizontal portion 611. The first connecting portion 614*a* and the second connecting portion 614*b* may be aligned in parallel to the vertical portion 612. The first connecting portion 614*a* and the second connecting portion 614*b* may be integrally formed to have a unitary construction with the stem electrode 613.

At least one end portion of the first branch electrodes 601*a* in the first domain A and at least one end portion of the fourth branch electrodes 601*d* in the fourth domain D may be connected to one another by the second connecting portion 614*b*. At least one end portion of the second branch electrodes 601*b* in the second domain B and at least one end portion of the third branch electrodes 601*c* in the third domain C may be connected to one another by the first connecting portion 614*a*.

In an exemplary embodiment, the first sub-pixel electrode PE1 may include, for example, a transparent conductive material such as indium-tin oxide ("ITO") or indium-zinc oxide ("IZO"). In an exemplary embodiment, for example, ITO may be, for example, a polycrystalline or monocrystalline material, and IZO may be a polycrystalline or monocrystalline material.

The first sub-pixel electrode PE1 may include the first extension electrode 181.

In an exemplary embodiment, the first extension electrode 181 is on the passivation layer 320. In such an exemplary embodiment, the first extension electrode 181 is on a portion of the passivation layer 320 that is in the transistor area T. The first extension electrode 181 extends from the first sub-pixel electrode PE1 to the transistor area T. The first extension electrode 181 is integrally formed to have a unitary construction with the first sub-pixel electrode PE1. The first extension electrode 181 overlaps the first drain electrode DE1. The first extension electrode 181 is connected to the first drain electrode DE1 through the first contact hole CH1.

The first extension electrode 181 may include substantially the same material as that in the first sub-pixel electrode PE1. The first extension electrode 181 may include a different material in another embodiment.

In an exemplary embodiment, the second sub-pixel electrode PE2 is on the passivation layer 320. In such an exemplary embodiment, the second sub-pixel electrode PE2 is on a portion of the passivation layer 320 that is in the second sub-pixel area P2. The second sub-pixel electrode PE2 may be substantially the same as the first sub-pixel electrode PE1 in terms of, for example, material and/or structure.

The second sub-pixel electrode PE2 may include substantially the same material as that in the first sub-pixel electrode PE1. The second sub-pixel electrode PE2 may include a different material in another embodiment.

The second sub-pixel electrode PE2 may include the second extension electrode 182. In an exemplary embodiment, the second extension electrode 182 is on the passivation layer 320. In such an exemplary embodiment, the second extension electrode 182 is on a portion of the passivation layer 320 in the transistor area T. The second extension electrode 182 extends from the second sub-pixel electrode PE2 to the transistor area T. The second extension electrode 182 may be integrally formed to have a unitary structure with the second sub-pixel electrode PE2. The second extension electrode 182 overlaps the first storage line 751, the second storage line 752, and the second drain electrode DE2. The second extension electrode 182 is connected to the second drain electrode DE2 through the second contact hole CH2.

The second extension electrode 182 may include substantially the same material as that in the first sub-pixel electrode PE1. The second extension electrode 182 may have a greater planar area than that of the first extension electrode 181. The second extension electrode 182 may include a different material in another embodiment.

The overlapping area between the second sub-pixel electrode PE2 and the second storage line 752 is greater than the overlapping area between the first sub-pixel electrode PE1 and the first storage line 751.

A lower alignment layer may be formed on the first sub-pixel electrode PE1, the first extension electrode 181, the second sub-pixel electrode PE2, the second extension electrode 182, and the passivation layer 320. In an exemplary embodiment, the lower alignment layer may be a homeotropic alignment layer or may include a photosensitive material.

In an exemplary embodiment, a black matrix 376 is formed on a second substrate 302. In such an exemplary embodiment, the black matrix 376 is on a portion of the second substrate 302 aside from a portion thereof corresponding to a pixel area, for example, the first sub-pixel area P1 and the second sub-pixel area P2. In an another exemplary embodiment, the black matrix 376 may be on the first substrate 301 rather than on the second substrate 302.

In an exemplary embodiment, the color filter 354 may be on a portion of the second substrate 302 corresponding to the pixel area, for example, the first sub-pixel area P1 or the second sub-pixel area P2. The color filter 354 may include, for example, a red color filter, a green color filter, and a blue color filter. In an another exemplary embodiment, the color filter 354 may be on the first substrate 301 rather than on the second substrate 302.

In an exemplary embodiment, an overcoat layer 722 is on the black matrix 376 and the color filter 354. In such an exemplary embodiment, the overcoat layer 722 may be over substantially the entire surface of the second substrate 302 on which the black matrix 376 and the color filter 354 are disposed.

The overcoat layer 722 may effectively remove a step difference among components between the overcoat layer 722 and the second substrate 302, e.g., the components of the second substrate 302, for example, the black matrix 376 and the color filter 354. In addition, the overcoat layer 722 may reduce or effectively prevent the external leakage of a dye in the color filter 354.

In an exemplary embodiment, the common electrode 210 is on the overcoat layer 722. In such an exemplary embodiment, the common electrode 210 may be disposed over substantially the entire surface of the second substrate 302 on which the overcoat layer 722 is disposed. In another exemplary embodiment, the common electrode 210 may be on portions of the overcoat layer 722 corresponding to the first sub-pixel area P1 and the second sub-pixel area P2. A common voltage Vcom is applied to the common electrode 210.

An upper alignment layer may be on the common electrode 210 and the overcoat layer 722. In an exemplary embodiment, the upper alignment layer may be a homeotropic alignment layer or may be an alignment layer that is photo-aligned using a photopolymerizable material.

The liquid crystal layer 333 is between the first substrate 301 and the second substrate 302. In an exemplary embodiment, the liquid crystal layer 333 may include, for example, a photopolymerizable material, and the photopolymerizable material may include a reactive monomer or a reactive mesogen.

When surfaces of the first substrate 301 and the second substrate 302 opposing one another are defined as upper surfaces (e.g., inner surfaces) of the corresponding substrates, respectively, and when surfaces of the first substrate 301 and the second substrate 302 opposite to the upper surfaces thereof are defined as lower surfaces (e.g., outer surfaces) of the corresponding substrates, respectively, an upper polarizer may be disposed on the lower surface of the first substrate 301 and a lower polarizer may be disposed on the lower surface of the second substrate 302.

In one exemplary embodiment, a transmission axis of the upper polarizer may be substantially perpendicular to a transmission axis of the lower polarizer. Thus, one of the two transmission axes may be aligned parallel to the linear portion 411 of the gate line GL. In another exemplary embodiment, the display device may include only one of the upper polarizer or the lower polarizer.

Figure 7:
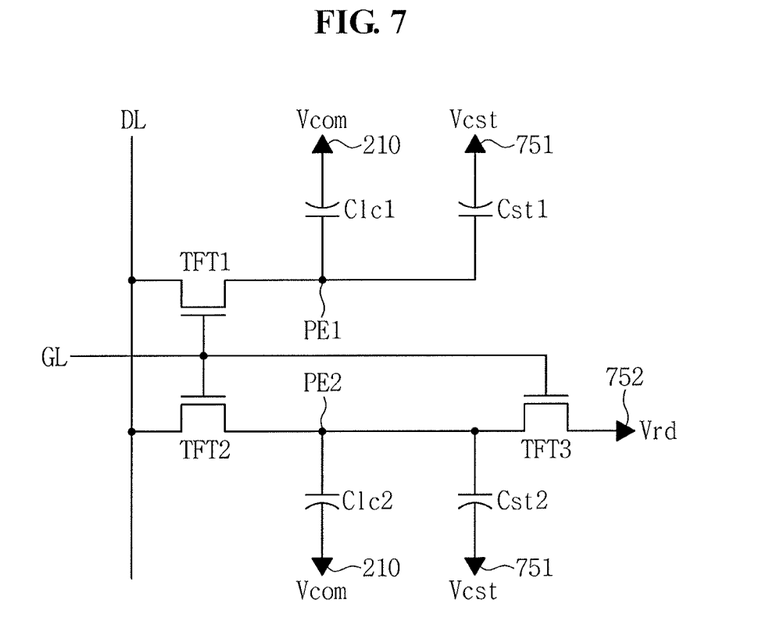
FIG. 7 illustrates an embodiment of a pixel circuit.

FIG. 7 illustrates an embodiment of an equivalent circuit diagram of the pixel in FIG. 1. Referring to FIG. 7, the pixel includes the first thin film transistor TFT1, a first liquid crystal capacitor Clc1, a first storage capacitor Cst1, the second thin film transistor TFT2, a second liquid crystal capacitor Clc2, a second storage capacitor Cst2, and the third thin film transistor TFT3.

The first thin film transistor TFT1 is controlled based on a gate signal from the gate line GL and is connected between the data line DL and the first sub-pixel electrode PE1. The first thin film transistor TFT1 is turned on by a gate high voltage of the gate signal to apply a data signal from the data line DL to the first sub-pixel electrode PE1.

The first liquid crystal capacitor Clc1 includes the first sub-pixel electrode PE1 opposite to the common electrode 210 opposite. As previously described, the common voltage Vcom is applied to the common electrode 210.

The first storage capacitor Cst1 includes the first sub-pixel electrode PE1 opposite to the first storage line 751. As previously described, the first storage voltage Vcst is applied to the first storage line 751. In an exemplary embodiment, the first storage voltage Vcst may have substantially the same level as common voltage Vcom. In another embodiment, Vcst may be different from the level of Vcom.

The second thin film transistor TFT2 is controlled based on the gate signal from the gate line GL and is connected between the data line DL and the second sub-pixel electrode PE2. The second thin film transistor TFT2 is turned on by a gate high voltage of the gate signal to apply the data signal from the data line DL to the second sub-pixel electrode PE2.

The second liquid crystal capacitor Clc2 includes the second sub-pixel electrode PE2 and the common electrode 210 opposite to one another.

The second storage capacitor Cst2 includes the second sub-pixel electrode PE2 opposite to the first storage line 751. As previously described, the first storage voltage Vcst is applied to the first storage line 751. In an exemplary embodiment, the first storage voltage Vcst may have substantially the same level as common voltage Vcom.

The third thin film transistor TFT3 is controlled based on the gate signal from the gate line GL and is connected between the second liquid crystal capacitor Clc2 and the second storage line 752. The third thin film transistor TFT3 is turned on by a gate high voltage of the gate signal to divide a voltage charged in the second liquid crystal capacitor Clc2.

The pixel in FIG. 7 operates as follows. When a gate signal is applied to the gate line GL, a data voltage transmitted to the data line DL is applied to each of the first sub-pixel electrode PE1 and the second sub-pixel electrode PE2 respectively through the first thin film transistor TFT1 and the second thin film transistor TFT2.

The data voltage transmitted through the first thin film transistor TFT1 is substantially entirely applied to the first sub-pixel electrode PE1, whereas only a portion of the data voltage transmitted through the second thin film transistor TFT2 is applied to the second sub-pixel electrode PE2 due to the third thin film transistor TFT3. Accordingly, the luminance of light emitted from the first sub-pixel area P1 in which the first sub-pixel electrode PE1 is disposed is greater than the luminance of light emitted from the second sub-pixel area P2 in which the second sub-pixel electrode PE2 is disposed.

For example, when a gate signal is applied to the gate line GL, a data voltage applied to the second source electrode SE2 of the second thin film transistor TFT2 is transmitted to the second drain electrode DE2 of the second thin film transistor TFT2 through the channel of the second thin film transistor TFT2. In an exemplary embodiment, the data voltage transmitted to the second drain electrode DE2 of the second thin film transistor TFT2 is partially applied to the second sub-pixel electrode PE2 and is partially discharged to the second storage line 752 through the third thin film transistor TFT3.

In such an exemplary embodiment, the level of the data voltage applied to the second sub-pixel electrode PE2 may be adjusted by adjusting the level of the second storage voltage Vrd applied to the second storage line 752. Accordingly, levels of voltages charged in the first liquid crystal capacitor Clc1 and the second liquid crystal capacitor Clc2 may be appropriately adjusted to allow an image viewed from a side of the display device to be as close as possible to an image viewed from the front of the display device. Thus, the side visibility of the display device may be enhanced.

Figure 8:
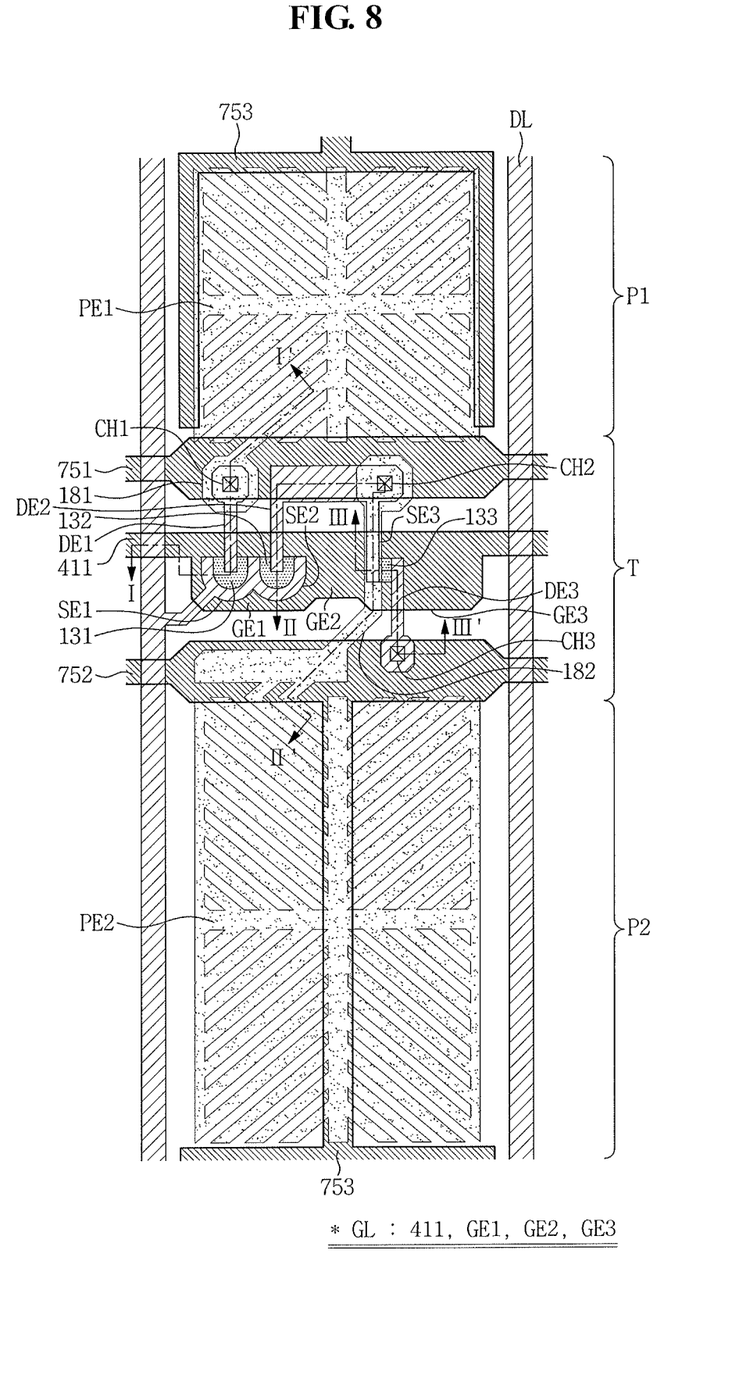
FIG. 8 illustrates another embodiment of a pixel.

FIG. 8 illustrates another embodiment of a pixel where a third storage line 753 is adjacent to another side of the first sub-pixel electrode PE1. The third storage line 753 overlaps the first sub-pixel electrode PE1, is spaced apart from the first storage line 751, and is connected to the second storage line 752. In such an exemplary embodiment, the third storage line 753 receives a storage voltage having substantially the same level as the storage voltage applied to the second storage line 752.

For example, the third storage line 753 is on the first substrate 301 (refer, e.g., to FIG. 2). The third storage line 753 is in the first sub-pixel area P1 of the first substrate 301 and extends along an edge of the first sub-pixel electrode PE1. In an exemplary embodiment, the third storage line 753 is adjacent to three sides of the first sub-pixel electrode PE1. The third storage line 753 and the first storage line 751 collectively surround the first sub-pixel electrode PE1. In such an exemplary embodiment, the third storage line 753 and the first sub-pixel electrode PE1 may or may not overlap one another. When the third storage line 753 and the first sub-pixel electrode PE1 overlap one another, a portion of the third storage line 753 and an edge of the first sub-pixel electrode PE1 may overlap one another.

The third storage line 753 receives an externally applied third storage voltage. In an exemplary embodiment, the third storage voltage may have substantially the same level as the second storage voltage Vrd. The third storage line 753 and the second storage line 752 are connected to one another. The third storage voltage may have a different level as the second storage voltage Vrd in another embodiment.

The third storage line 753 may include substantially the same material and may have substantially the same structure (e.g., multilayer structure) as those of the gate line GL. In other words, the gate line GL and the third storage line 753 may be simultaneously provided in substantially the same process. The materials and structures may be different in another embodiment.

Figure 9:
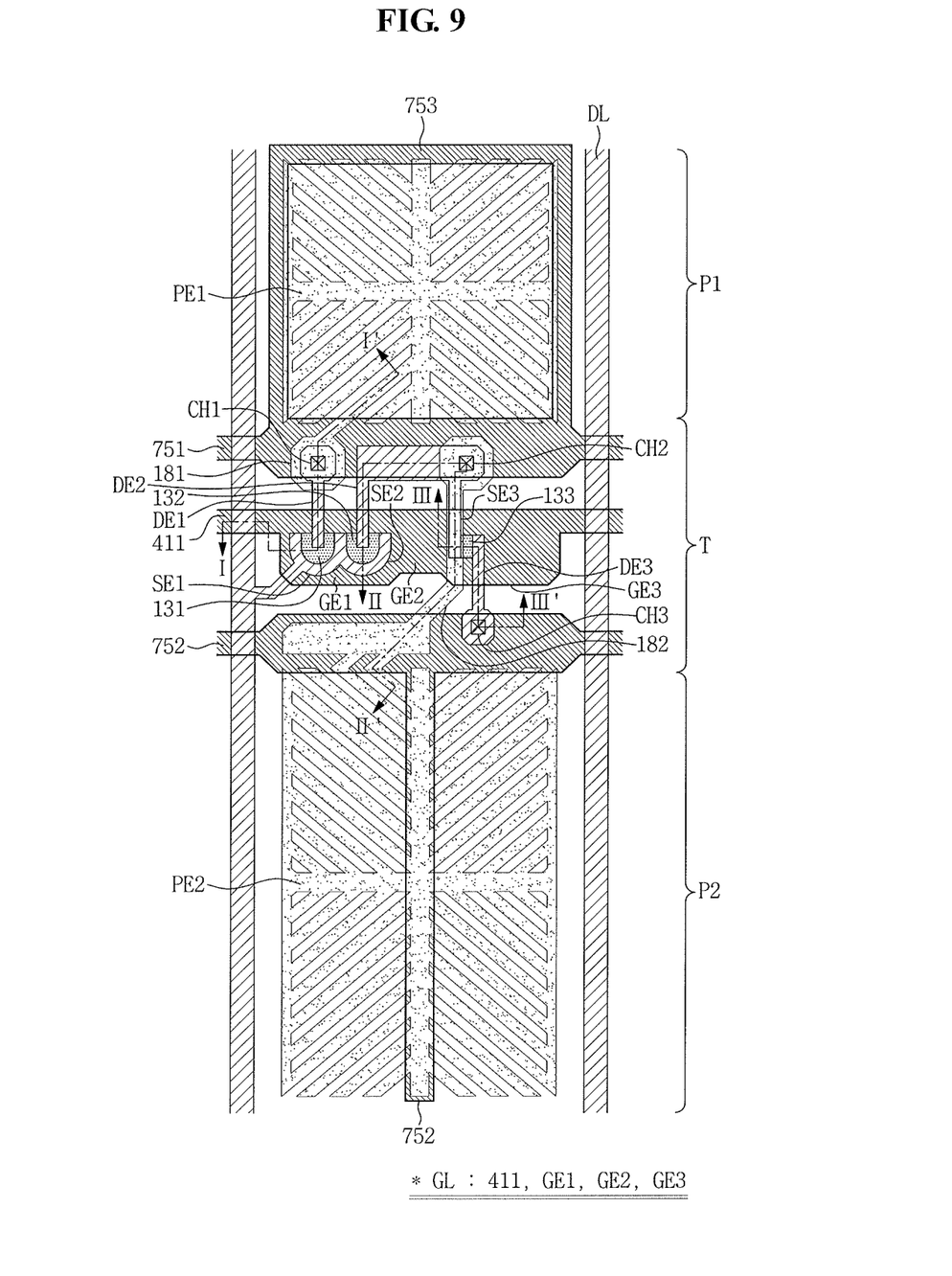
FIG. 9 illustrates another embodiment of a pixel.

FIG. 9 illustrates another embodiment of a pixel where the third storage line 753 is adjacent to another side of the first sub-pixel electrode PE1. The third storage line 753 overlaps the first sub-pixel electrode PE1, is spaced apart from the second storage line 752, and is connected to the first storage line 751. In such an exemplary embodiment, the third storage line 753 receives a storage voltage having substantially the same level as the storage voltage applied to the first storage line 751. The storage voltages may be different in another embodiment.

For example, the third storage line 753 is disposed on the first substrate 301 (refer, e.g., to FIG. 2). The third storage line 753 is in the first sub-pixel area P1 of the first substrate 301. The third storage line 753 extends along an edge of the first sub-pixel electrode PE1. In an exemplary embodiment, the third storage line 753 is adjacent to three sides of the first sub-pixel electrode PE1. The third storage line 753 and the first storage line 751 collectively surround the first sub-pixel electrode PE1. In such an exemplary embodiment, the third storage line 753 and the first sub-pixel electrode PE1 may or may not overlap one another. When the third storage line 753 and the first sub-pixel electrode PE1 overlap one another, a portion of the third storage line 753 and an edge of the first sub-pixel electrode PE1 may overlap one another.

The third storage line 753 receives an externally applied third storage voltage. In an exemplary embodiment, the third storage voltage may have substantially the same level as the first storage voltage Vcst. The third storage line 753 and the first storage line 751 are connected to one another. The third storage voltage may have a different level from the first storage voltage Vcst in another embodiment.

The third storage line 753 may include substantially the same material and may have substantially the same structure (e.g., multilayer structure) as those of the gate line GL. In other words, the gate line GL and the third storage line 753 may be simultaneously provided in substantially the same process. The materials and structures may be different in another embodiment.

In accordance with one or more of the aforementioned embodiments, an LCD device includes a first storage line and a second storage line which are physically and electrically separated (e.g., isolated) from one another. The second storage line is in a second sub-pixel area and is not adjacent to a first sub-pixel electrode.

Accordingly, a coupling capacitance may not be formed between the second storage line and the first sub-pixel electrode. Thus, a data voltage applied to the first sub-pixel electrode may not be affected by IR drop in the second storage line, and thus a voltage level variation in the data voltage applied to the first sub-pixel electrode may be relatively reduced. As a result, image quality degradation (e.g., afterimage, flicker, etc.) may be mitigated.

In such exemplary embodiments, the level of a second storage voltage of the second storage line, which is not connected to the first storage line, may vary arbitrarily.

Accordingly, based on the level of a first storage voltage, which is maintained at the substantially constant level, the level of the second storage voltage may vary to be lower or higher than the level of the first storage voltage.

When the level of the second storage voltage is lower than the level of the first storage voltage, afterimage elimination efficiency of the display device may be increased. When the level of the second storage voltage is higher than the level of the first storage voltage, flicker elimination efficiency of the display device may be increased.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A liquid crystal display device, comprising:
   a first substrate;
   a second substrate opposing the first substrate;
   a liquid crystal layer between the first substrate and the second substrate;
   a first pixel comprising a first sub-pixel electrode and a second sub-pixel electrode;
   a second pixel comprising a third sub-pixel electrode and a fourth sub-pixel electrode, the first, second, third and fourth sub-pixel electrodes being arranged subsequently in a first direction;
   a first storage line adjacent to one side of the first sub-pixel electrode;
   a second storage line spaced apart from the first storage line and adjacent to one side of the second sub-pixel electrode;
   a third storage line spaced apart from the first storage line, connected to the second storage line, and adjacent to and overlapping one side of the third sub-pixel electrode; and
   a fourth storage line spaced apart from the third storage line and adjacent to another side of the third sub-pixel electrode.

2. The display device as claimed in claim 1, further comprising:
   a gate line and a data line on the first substrate;
   a first transistor connected to the gate line, the data line, and the first sub-pixel electrode;
   a second transistor connected to the gate line, the first transistor, and the second sub-pixel electrode; and
   a third transistor connected to the gate line, the second transistor, and the second storage line.

3. The display device as claimed in claim 1, wherein:
   the first storage line and the fourth storage line are to receive storage voltages having same levels from one another, and
   the first storage line and the second storage line are to receive storage voltages having different levels from one another.

4. The display device as claimed in claim 1, wherein:
   the first storage line at least partially overlaps the first sub-pixel electrode, and
   the fourth storage line at least partially overlaps the third sub-pixel electrode.

5. The display device as claimed in claim 1, wherein the second storage line at least partially overlaps the second sub-pixel electrode.

6. The display device as claimed in claim 5, wherein the second storage line is between the first sub-pixel electrode and second sub-pixel electrode.

7. The display device as claimed in claim 1, wherein the third storage line partially overlaps the third sub-pixel electrode.

8. The display device as claimed in claim 7, wherein the third storage line is between the second sub-pixel electrode and third sub-pixel electrode.

9. The display device as claimed in claim 1, wherein the third storage line and the fourth storage line surround the third sub-pixel electrode.

10. The display device as claimed in claim 1, wherein the third storage line is adjacent to three side of the third sub-pixel electrode.

11. The display device as claimed in claim 1, wherein each of the first, second, third and fourth sub-pixel electrode includes:
    a stem electrode; and
    a branch electrode extending from the stem electrode.

12. The display device as claimed in claim 11, further comprising a coupling portion connecting the second storage line to the third storage line, the coupling portion extending along and overlapping the stem electrode of the second sub-pixel electrode.

13. The display device as claimed in claim 1, wherein each of the first, second, third and fourth sub-pixel electrode includes:
    a first stem electrode extending in the first direction;
    a second stem electrode extending in the second direction different from the first direction, the second stem electrode intersecting the first stem electrode;
    a first branch electrode extending from the first stem electrode; and
    a second branch electrode extending from the second stem electrode.

14. The display device as claimed in claim 11, further comprising a coupling portion connecting the second storage line to the third storage line, the coupling portion extending along and overlapping the first stem electrode of the second sub-pixel electrode.

15. The display device as claimed in claim 1, wherein the second storage line is not directly electrically connected to the first storage line.

16. The display device as claimed in claim 15, wherein the fourth storage line is not directly electrically connected to the third storage line.

17. The display device as claimed in claim 1, wherein the a third storage line connects to the second storage line via a coupling portion of the second storage line, the coupling portion extending along and overlapping the stem electrode of the second sub-pixel electrode.

18. The display device as claimed in claim 1, wherein the third storage line overlaps multiple edges of the third sub-pixel electrode.

* * * * *